United States Patent [19]

Burts, Jr.

[11] Patent Number: 5,118,664

[45] Date of Patent: Jun. 2, 1992

[54] LOST CIRCULATION MATERIAL WITH RICE FRACTION

[75] Inventor: Boyce D. Burts, Jr., Maurice, La.

[73] Assignee: Bottom Line Industries, Inc., Lafayette, La.

[21] Appl. No.: 676,944

[22] Filed: Mar. 28, 1991

[51] Int. Cl.$^5$ ............................................. C09K 7/02
[52] U.S. Cl. .................................. 507/104; 507/112; 507/113; 507/140; 507/906; 166/308; 175/72
[58] Field of Search ................ 252/8.51, 8.512, 8.511; 166/308, 285, 292; 523/130; 175/72; 507/104, 112, 113, 140, 906

[56] References Cited

U.S. PATENT DOCUMENTS

| | | | |
|---|---|---|---|
| 2,417,307 | 3/1947 | Larsen | 252/8.51 |
| 2,498,301 | 2/1950 | Self | 252/8.51 |
| 2,536,113 | 1/1951 | Wagner | 252/8.51 |
| 2,571,093 | 10/1951 | Temple | 252/8.511 |
| 2,578,888 | 12/1951 | Kaveler | 252/8.515 |
| 2,600,404 | 6/1952 | Hoeppel | 252/8.51 |
| 2,601,050 | 6/1952 | Nestle | 252/8.51 |
| 2,610,149 | 9/1952 | Van Dyke | 252/8.512 |
| 2,749,308 | 6/1956 | Van Beckum | 507/104 |
| 2,778,604 | 1/1957 | Reistle, Jr. | 252/8.512 |
| 2,779,417 | 1/1957 | Clark, Jr. et al. | 166/293 |
| 2,799,647 | 7/1957 | Borcherdt | 507/104 |
| 2,811,488 | 10/1957 | Nestle | 252/8.512 |
| 2,812,161 | 11/1957 | Mayhew | 507/126 |
| 2,815,079 | 12/1957 | Goins, Jr. et al. | 252/8.512 |
| 2,943,680 | 7/1960 | Scott et al. | 507/104 |
| 2,986,538 | 5/1961 | Nesbitt et al. | 252/8.512 |
| 3,042,607 | 7/1962 | Morris | 252/8.512 |
| 3,219,111 | 11/1965 | Armentrout | 507/140 |
| 3,559,735 | 2/1971 | Corrin | 166/275 |
| 3,629,102 | 12/1971 | Lummus | 252/8.512 |
| 3,749,171 | 7/1973 | Marx | 166/274 |
| 3,788,405 | 1/1974 | Taylor | 175/72 |
| 4,082,677 | 4/1978 | Zollar et al. | 252/8.512 |
| 4,247,403 | 1/1981 | Foley et al. | 175/72 X |
| 4,397,354 | 8/1983 | Dawson et al. | 166/294 |
| 4,422,948 | 12/1983 | Corley et al. | 175/72 X |
| 4,474,665 | 10/1984 | Green | 175/72 X |
| 4,619,772 | 10/1986 | Black et al. | 507/104 |
| 4,964,465 | 10/1990 | Surles | 166/295 |
| 5,004,553 | 4/1991 | House et al. | 252/8.51 |

OTHER PUBLICATIONS

"Drilling and Drilling Fluids", by Chilingarian et al., 1983, published by Elsevier, pp. 547–549.

"Composition and Properties of Oil Well Drilling Fluids" by Rogers, 1963, 3rd Edn., Gulf Publishing Company, pp. 663–671.

"Lost Circulation in Geothermal Wells: Survey and Evaluation of Industry Experience".

Baroid Catalog, 1966–1967.

*Composition and Properties of Oil Well Drilling Fluids*, Gray 7 Darley, pp. 432, 434, 578, 580, 582.

*Lost Circulation*, Messenger, pp. 25 and 30.

*Drilling Fluids Optimization*, Lummus and Azar, pp. 118, 124.

Primary Examiner—Robert L. Stoll
Assistant Examiner—C. Sayala
Attorney, Agent, or Firm—Pravel, Gambrell, Hewitt, Kimball & Krieger

[57] ABSTRACT

An additive to reduce fluid loss from drilling fluids is comprised of comminuted products from the rice plant or blends of other comminuted plant materials with the rice products. Polymers to reduce fluid loss even lower and friction-reducing materials may be added to the plant materials.

2 Claims, No Drawings

LOST CIRCULATION MATERIAL WITH RICE FRACTION

BACKGROUND OF THE INVENTION

1. Field of the Invention

This invention relates to well drilling fluid additives. More specifically, there is provided a mixture of components which, when added to drilling fluid or circulated through a borehole before casing is placed in the well, is effective in substantially reducing loss of fluid from the borehole.

2. Description of Related Art

The problems of reducing fluid loss from drilling wells have been recognized and addressed for decades. The generic causes of fluid loss from boreholes to the surrounding earth formations are well-known. They include: natural fractures in the rocks drilled, induced fractures when pressure in the drilling fluid exceeds fracturing stress of the earth, cavernous formations, and highly permeable formations. Unfortunately, the cause of fluid loss in drilling a particular well is not always known. Therefore, a variety of responses are often employed in attempts to control loss of fluid from a well. If the cause is believed to be natural or induced fractures or caverns, corrective action may begin by circulating into the well a pill or slug of larger particles at high concentration. This pill may contain a blend of granular, fibrous and flake materials with a particle size distribution believed to be large enough to form a bridge of material in the fracture or cavern. It is important that the bridge be within the formation and not on the surface of the wellbore where it can be dislodged by the drill pipe.

After a bridge is formed, it will still be necessary to form a seal of finer material on the bridge to reduce fluid loss from the wellbore to an acceptable level. If highly permeable formations are open to the wellbore, it is also necessary to form a seal of these formations to decrease fluid loss. Thus, a sealing composition for drilling fluids has a wide range of applicability.

To form a seal over a bridge that has been formed in a fracture or cavern or over a highly permeable formation, it has been found that a matting or caking effect should take place. A gradation of particle sizes, shapes and rigidity is beneficial in forming the seal, and there is an optimum blend to produce maximum fluid loss control with the seal. Obtaining a very effective seal will have the effects of reducing the occurrences of stuck drill pipe, reducing frictional drag between the drill pipe and the borehole wall, aiding in running casing or liners in the well, and possibly improving the quality of logs run in the well.

Both water-based and oil-based fluids are commonly used for drilling. The loss of fluid is usually more costly for oil-based fluids, because the base fluid is more expensive, but loss of fluid can be quite costly with water-based fluids also, because of the chemicals in the fluid.

Chemicals are added to drilling fluids for increased density, viscosity, and gel strength, for lower friction between the drill pipe and the borehole wall and for other purposes. The chemicals added for forming a barrier to flow on the borehole wall or in openings connected to the wall, called lost circulation materials, must be compatible with all the other functions to be performed by the drilling fluid and with all the chemicals added to produce the desired properties of the drilling fluid. In addition, the chemicals are preferably non-toxic and biodegradable.

A variety of naturally-occurring products have been used as lost circulation materials in the past. U.S. Pat. No. 4,619,772 discloses ground durum derived from the outer portion of the endosperm of the durum kernel. This material serves more as a viscosifier than as a fluid loss agent, but actually serves both purposes. U.S. Pat. No. 4,474,665 discloses the use of ground and sized cocoa bean shells, said to be a universal lost circulation controller. This product has not been widely accepted in industry.

The report "Lost Circulation in Geothermal Wells—Survey and Evaluation of Industry Experience," Report No. SAND81-7129, prepared for Sandia National Laboratories in 1981, surveys broad industry experience with lost circulation materials and provides a listing of materials used in the past. The report includes the results of an extensive literature survey. As discussed in the report (Table 3), a variety of wood fibers, cane fibers, organic fibers, nut hulls and seed hulls have been offered for use. Also, graded blends have been available.

Carbon particles are often added to drilling fluids for the purpose of reducing the frictional resistance of the drill pipe in contact with the borehole wall. The carbon particles embed on the cake or mat formed at the wall of the borehole over permeable formations drilled during drilling operations. It is believed that the carbon particles serve as a lubricant in the cake. This lower frictional resistance is very useful in preventing sticking of the drill pipe during drilling, especially where high permeability formations are in contact with the borehole. Therefore, the carbon particles enhance the benefits of the fluid loss additives.

There remains a need for a blend of materials which can function more effectively to reduce fluid loss from a borehole in a wide range of circumstances, with water-based or oil-based fluids, which is compatible with the other functions desired in a drilling fluid, and which is economical to use.

SUMMARY OF THE INVENTION

In one embodiment of this invention, there is provided a drilling fluid additive comprising comminuted materials from the rice plant. In another embodiment there is provided a mixture comprising materials from the rice plant and other plant materials. In yet another embodiment there is provided a method of decreasing fluid loss from wellbores into subsurface formations by mixing comminuted rice products and other comminuted plant materials, adding the materials to drilling fluid and circulating the mixture through a well.

DESCRIPTION OF PREFERRED EMBODIMENTS

Rice fraction is available in the form of rice hulls, rice tips, rice straw and rice bran. These different parts of the rice plant are separated commercially and are widely available from rice mills. The rice fraction is a common by-product when finished rice is brought to market. Each of these products can be comminuted to very fine particle sizes by drying the products and using hammer mills, cutter heads or other comminution methods. Air classification equipment or other means can be used for separation of desired ranges of particle sizes using techniques well-known in industry.

Many other materials derived from natural plants are available in industry, some as by-products and some as principal products of those plants. These include the following materials: peanut hulls, wood fiber, cotton seed hulls, cotton seed stems, corn cobs, almond hulls, flax seed, flax stems, wheat hulls, wheat tips, wheat stems, wheat bran, coconut hulls, oat hulls, oat tips, oat stems, oat bran, sunflower seed hulls, sunflower seed stems, soybean hulls, soybean stems, maize, maize stems, rye grass seed, rye grass stems, millet seed, millet stems, and barley. All these plant materials are available in industry in comminuted form or they can be prepared using well-known techniques.

The size fraction of all these plant materials suitable for the present invention may be from about −65 mesh to about −100 mesh, but preferably is from about −65 mesh to about −85 mesh. Mesh size for purposes of this invention refers to standard U.S. mesh.

For preparation of blends of plant materials, the comminuted plant materials are mixed in the desired proportions in a dry solid blender. A ribbon blender is suitable for mixing. Appropriate concentrations of the rice fractions are in the range from about 50 per cent to about 90 per cent by weight of the total plant materials and other materials. Preferably, the concentration of rice fraction is in the range from about 75 per cent to about 90 per cent. The concentration of other plant material is preferably in the range from about 3 per cent to about 50 per cent by weight of the total plant materials and other materials.

Although carbon particles are not added to drilling fluid additives as a lost circulation material, it is convenient to add carbon particles along with a mixture of lost circulation materials because the carbon particles serve one of the functions of the lost circulation materials, that is, to reduce frictional resistance to movement of the drill pipe. The carbon particles may be any size from −20 mesh to −100 mesh, but preferably are in a size range from about −20 mesh to about −85 mesh.

When the plant materials of this invention are to be added to a water-based drilling fluid, it is also advantageous to add a small amount of oil to the mixture. This oil is preferably added while the rice fraction and other comminuted plant materials are being mixed in the desired ratio. This mixing may take place in a ribbon blender, where the oil in the required amount is applied by a spray bar. The oil wets the particles and adds to their lubricity while at the same time helping to control dust produced by the mixing operation. A variety of oils may be used for this invention. A suitable oil has been found to be ISOPAR V, available from Exxon Corporation, or an equivalent oil. Suitable concentrations of the oil are in the range from about 1 per cent to about 10 per cent by weight of the total weight of the mixture of plant materials.

It is known that water-soluble polymers further reduce the fluid loss rate through a mat or cake of fine solid materials. Therefore, it is preferable to add an effective amount of a polyanionic cellulosic type of polymer to the mixture of plant materials. A suitable polymer is carboxymethylcellulose, which is widely available. Suitable concentrations of the polymer are in a range from about 0.1 to about 0.5 per cent by weight.

To test the efficacy of comminuted plant materials for their ability to reduce lost circulation, the following tests were performed. A 60 cc plastic syringe was fitted with a piece of 60 mesh wire screen in the barrel of the syringe and filled half-full with 20-40 mesh round sand of the type commonly used for gravel packing of oil and gas wells. The packed sand had a permeability of about 120 darcies and a porosity of about 35 per cent. Mixtures of ground plant material and drilling fluid were prepared at a concentration of 15 pounds per barrel of drilling fluid. The plant materials were weighed and mixed with 350 ml of water-based drilling fluid and agitated for 5 minutes. The mixture was then poured into the top of the syringe and pressure was applied with the plunger until the drilling fluid was forced out of the end of the syringe or a seal formed at the sand/fluid interface. When a seal formed, the length of penetration of fluid into the sand column was then measured. Results were as follows:

TABLE I

| Fluid | Fluid Penetration into Sand Depth of Intrusion, cm. |
|---|---|
| Water | No seal |
| Added rice fraction | 3.4 |
| Added peanut hulls | 4.3 |
| Added rice fraction/peanut hulls-50/50 mix | 2.9 |

The rice fraction alone decreased fluid loss to a lower value than did the peanut hulls. I discovered, surprisingly, that a synergistic effect was found with a mixture of rice fraction and peanut hulls. The reason for the synergistic effect is not known, but it is believed to result from the different hardness or shape of the particles resulting from the comminution process applied to the different plant materials.

Only water base was used for testing, but similar seal action has been experienced in using the materials in oil base mud.

The fluid loss additive may be used in a pill or slug by mixing in a separate tank the additive with a small portion of the drilling fluid being used to drill a well. Alternatively, it may be added to the drilling fluid by blending or mixing the additive with the entire drilling fluid volume being used to drill a well. Concentrations of the fluid loss additive in a pill or slug may range over a wide range, but preferably are in the range from about 10 pounds per barrel to about 40 pounds per barrel. When added to the entire volume of the drilling fluid, concentrations of the fluid loss additive preferably range from about 5 pounds per barrel to about 40 pounds per barrel.

EXAMPLE 1

A fluid loss additive suitable for control of lost circulation during drilling operations of a well is formulated as follows:

| Rice fraction (−85 mesh) | 82.8 wt % |
|---|---|
| Peanut hulls (−65 to −85 mesh) | 11.6 |
| Carbon beads (fine) | 3.8 |
| Carboxymethylcellulose (reg.) | 0.4 |
| Oil | 1.5 |

Excessive amounts of water-based drilling fluid are being lost from a well. The loss is believed to be caused by highly permeable formations which have been penetrated by the wellbore. A pill for lost circulation is mixed by placing 60 barrels of the drilling fluid in a tank and blending into the drilling fluid the fluid loss additive at a concentration of 15 pounds of additive per barrel of drilling fluid. The pill is then pumped down the drill pipe and up the annulus between the drill pipe and the borehole. The fluid loss rate from the well decreases to a value that is negligible.

The invention has been described with reference to its preferred embodiments. Those of ordinary skill in the art may, upon reading this disclosure, appreciate changes or modifications which do not depart from the scope and spirit of the invention as described above or claimed hereafter.

What I claim is:

1. A drilling fluid additive suitable for lost circulation control comprising a communited rice fraction and a comminuted plant material consisting of peanut hulls.

2. A drilling fluid additive comprising:
 a comminuted rice fraction in the range of concentration from about 75 to about 90 per cent by weight;
 a comminuted peanut hull fraction in the range of concentration from about 3 to about 50 per cent by weight;
 carbon beads in the range of concentration from about 1 per cent to about 5 per cent by weight to reduce friction between a borehole and drill pipe;
 a polyanionic cellulosic type of polymer in the range of concentration from about 0.1 to about 0.5 per cent by weight to reduce further fluid loss; and
 oil in the range of concentration from about 1 per cent to about 10 per cent by weight.

* * * * *